Jan. 24, 1933.　　　C. E. WHITE　　　1,895,432
AGRICULTURAL IMPLEMENT
Original Filed Nov. 8, 1918　　6 Sheets-Sheet 1
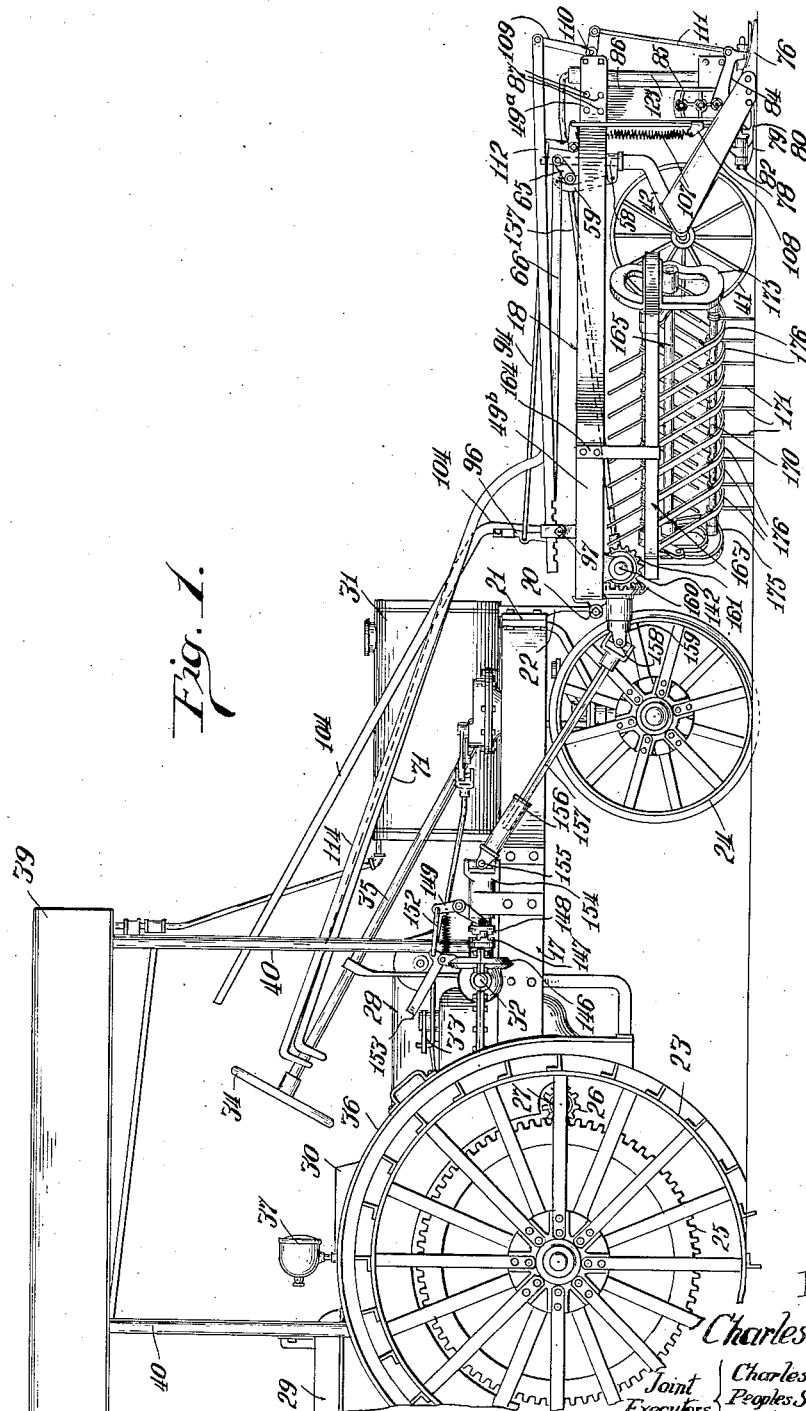

Jan. 24, 1933.   C. E. WHITE   1,895,432
AGRICULTURAL IMPLEMENT
Original Filed Nov. 8, 1918   6 Sheets-Sheet 2
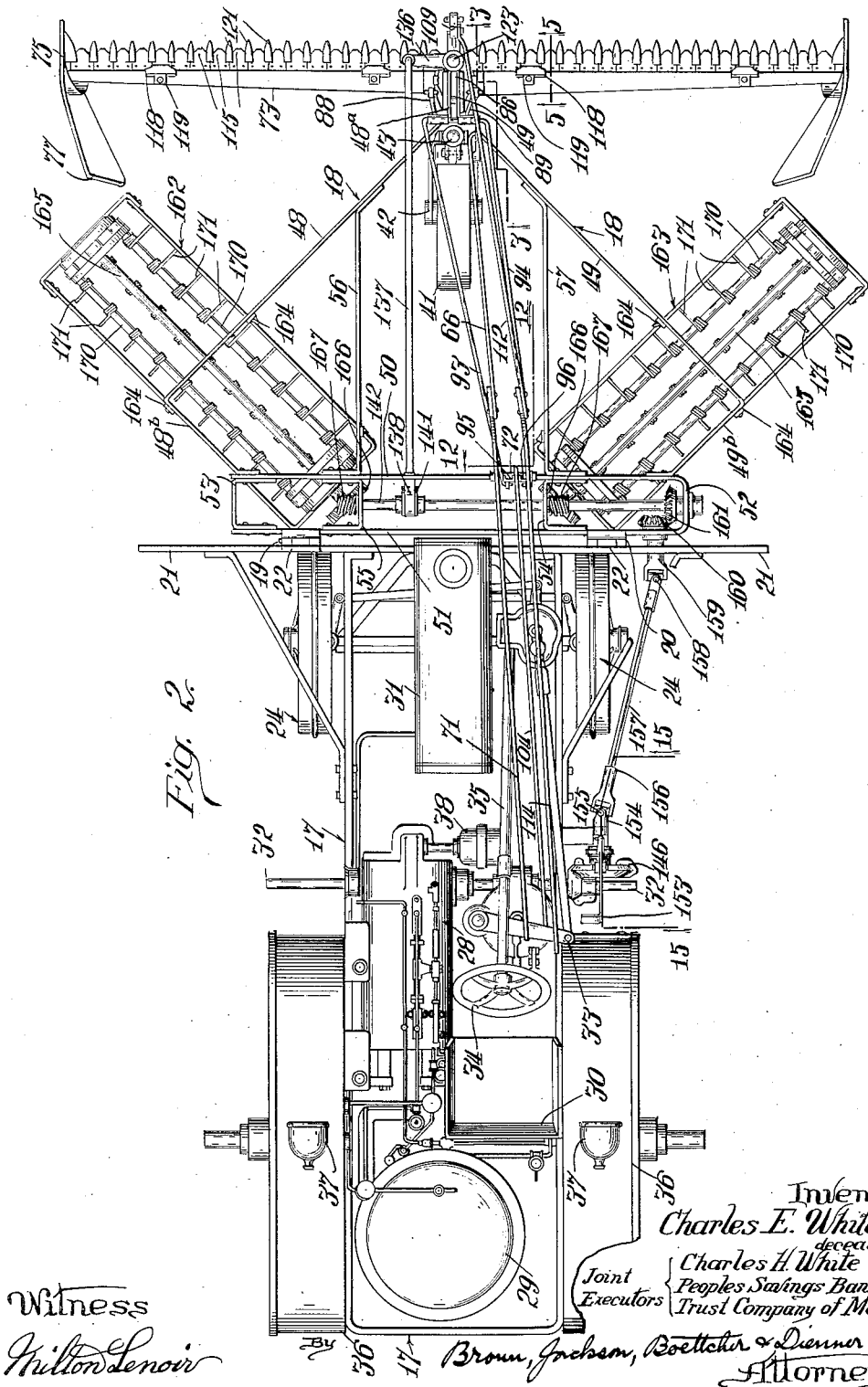

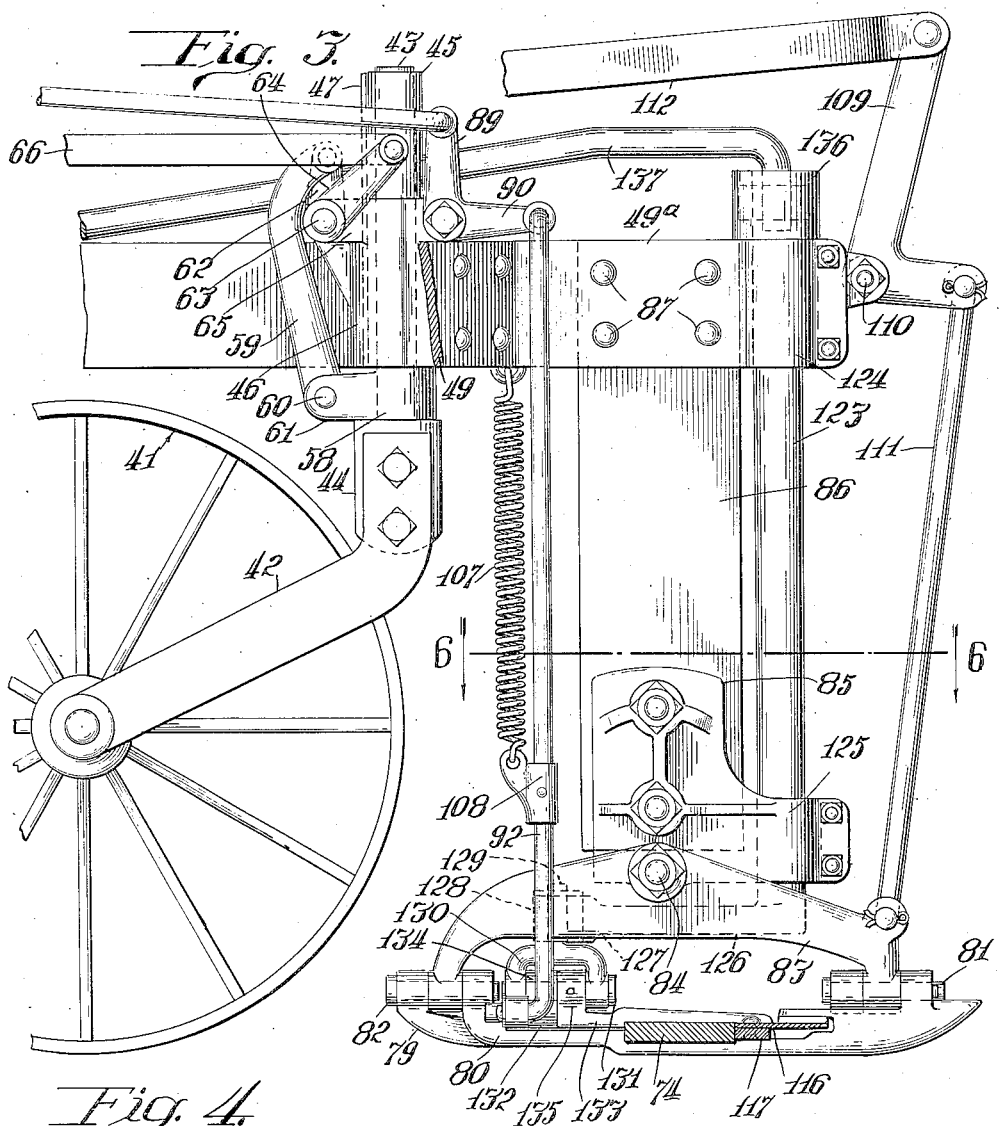
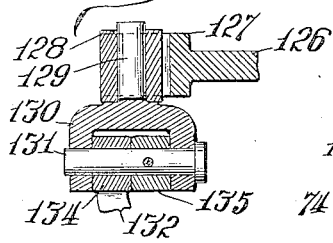
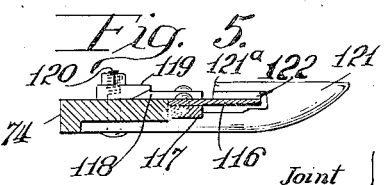

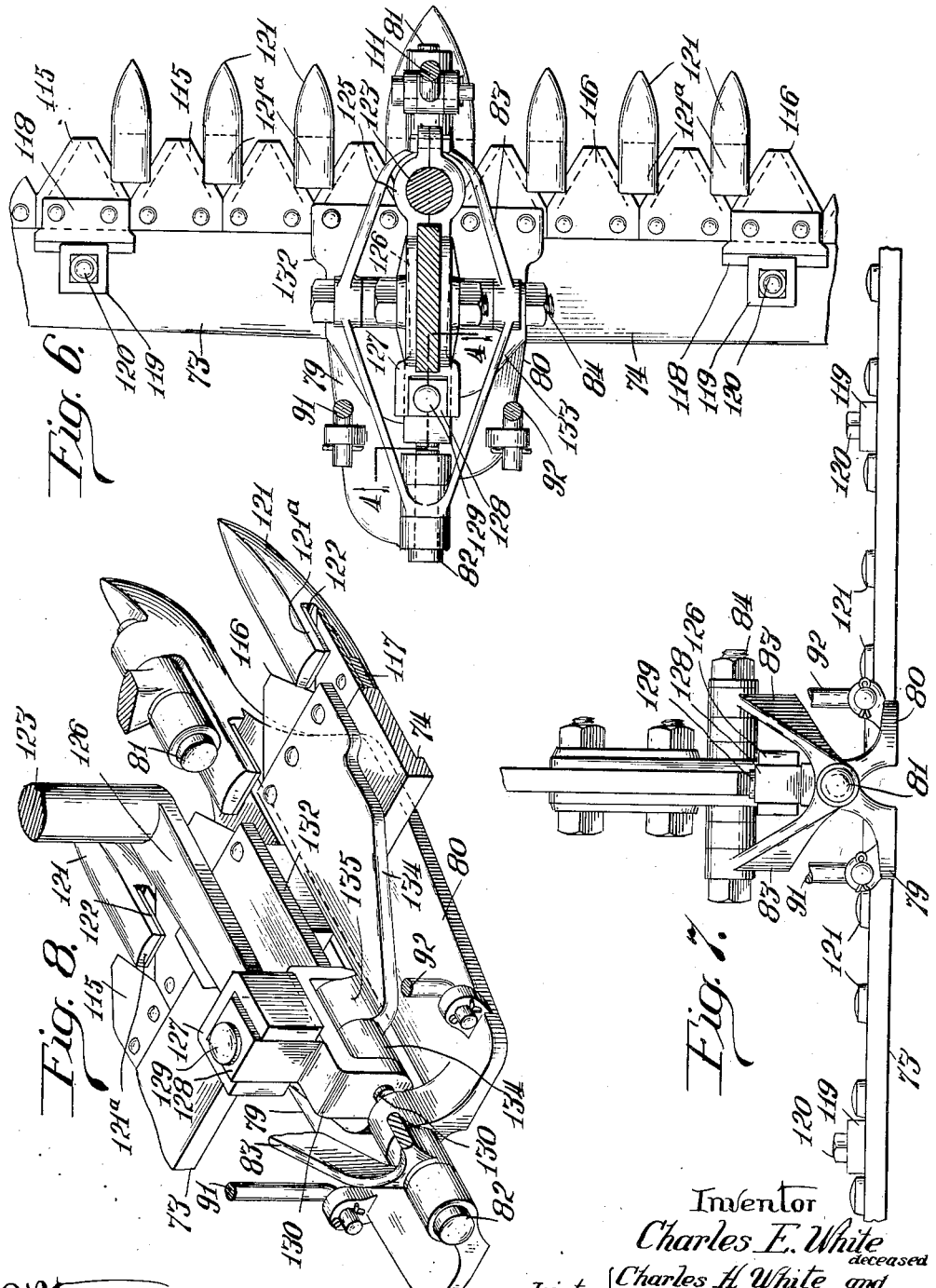

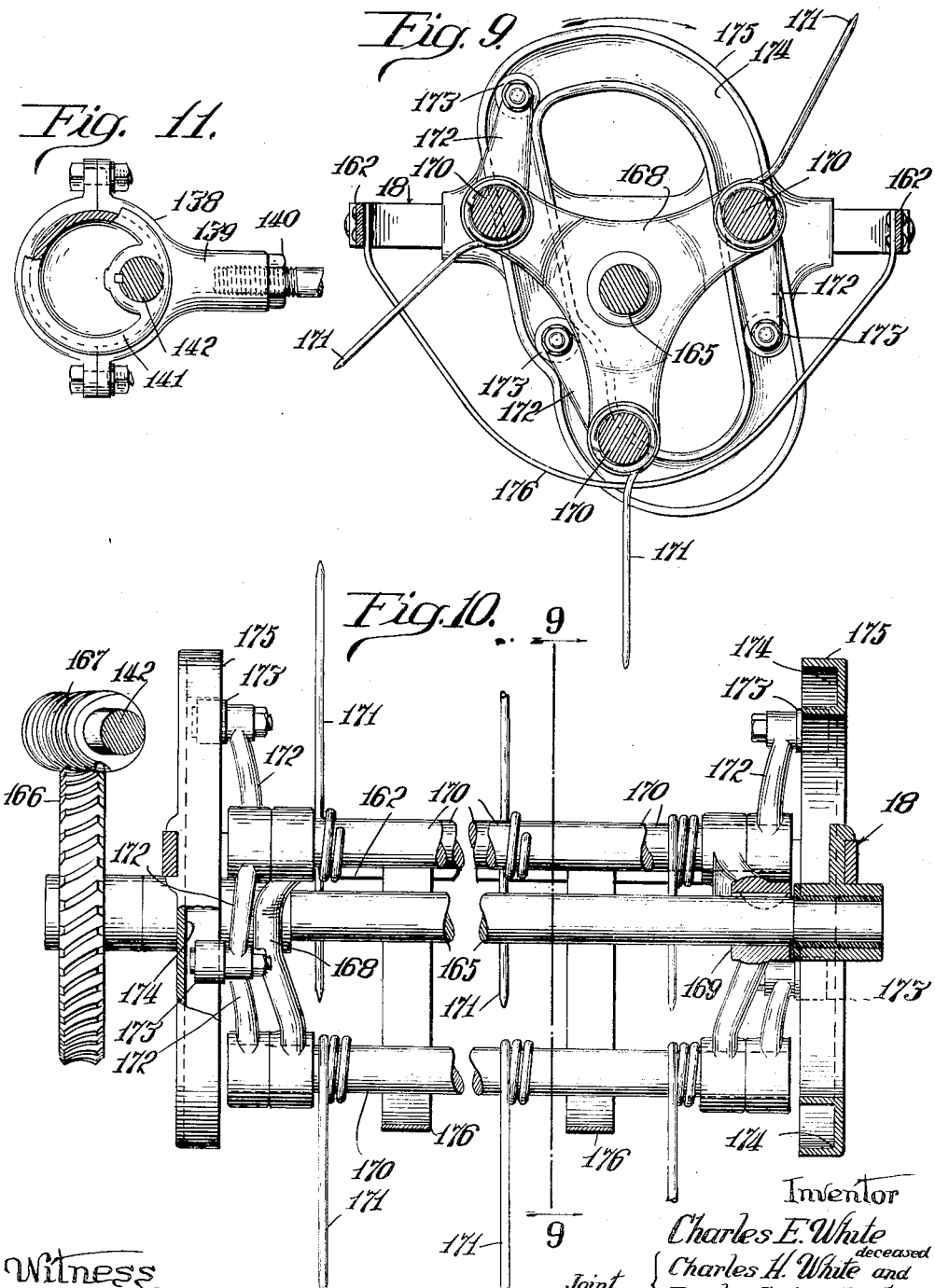

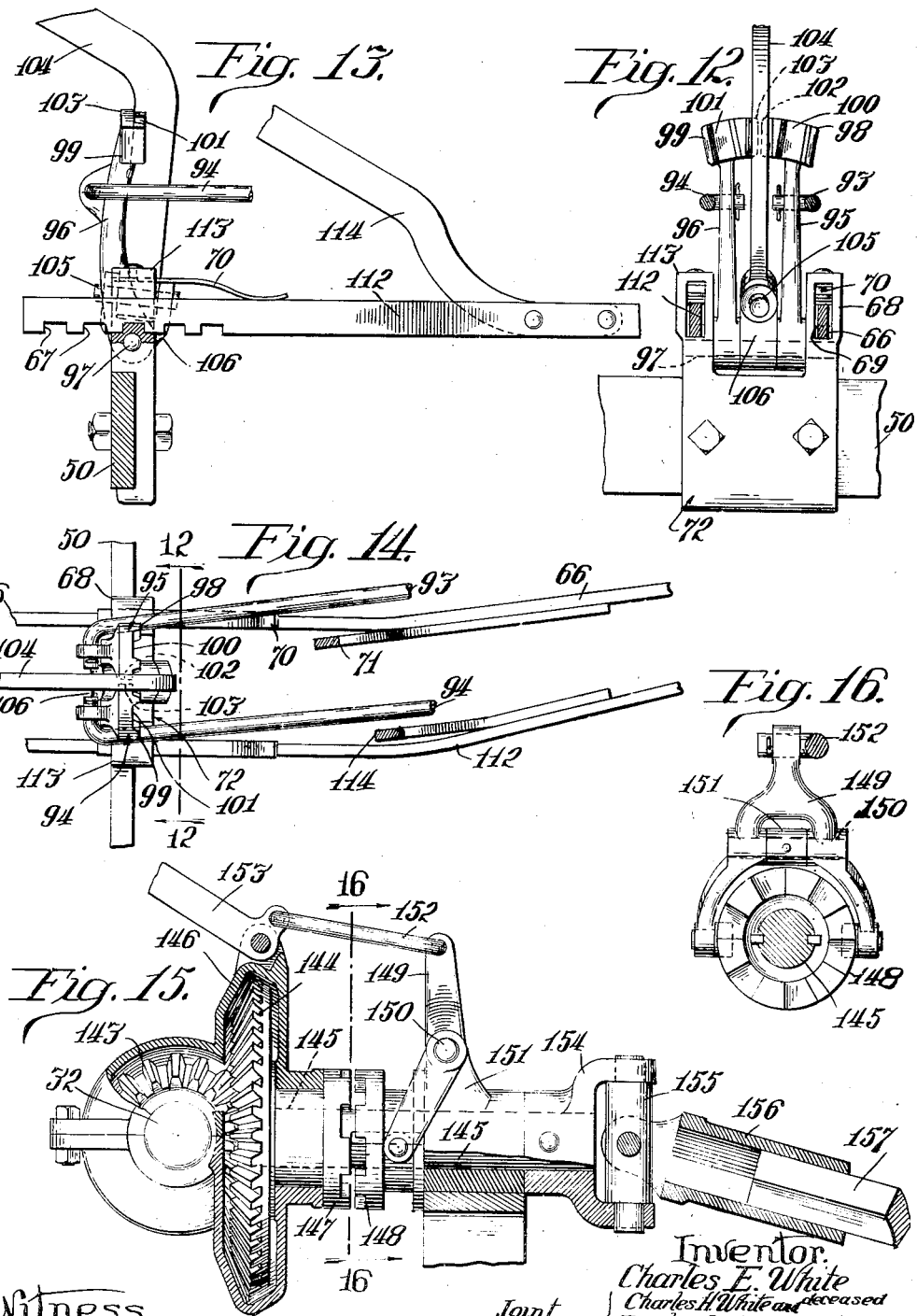

Patented Jan. 24, 1933

1,895,432

UNITED STATES PATENT OFFICE

CHARLES E. WHITE, DECEASED, LATE OF MOLINE, ILLINOIS, BY CHARLES HAROLD WHITE AND PEOPLES SAVINGS BANK & TRUST CO. OF MOLINE, OF MOLINE, ILLINOIS, JOINT EXECUTORS; SAID WHITE ASSIGNOR TO DEERE & COMPANY, OF MOLINE, ILLINOIS, A CORPORATION OF ILLINOIS

AGRICULTURAL IMPLEMENT

Original application filed November 8, 1918, Serial No. 261,657. Divided and this application filed December 30, 1929. Serial No. 417,484.

The present application is directed to improvements in agricultural implements and is divisional of copending application Serial No. 261,657, filed November 8, 1918.

One of the principal objects of the invention is to provide an improved agricultural implement in the nature of an attachment adapted to be mounted in front of a tractor to be propelled thereby.

Another object of the invention is to provide improved means for supporting the implement and connecting it to the tractor whereby the implement tools can rise and fall relatively to the tractor so that the proper operation and efficiency of such implement tools is maintained even when operating over uneven ground.

Another object of the invention is to provide such an implement attachment wherein the implement tools are operatively connected with two opposite laterally extending bars at the front of the tractor, supported at their inner ends for vertical movement by forwardly extending supporting means connected with the tractor, and having ground engaging supporting means at their outer ends, whereby such bars and the implement tools carried thereby can swing vertically in passing over uneven ground.

Another object is to provide for supporting transversely extending tool carrying members on supporting means extending forwardly from the front portion of a tractor arranged to be steered by steering means located at the forward end portion thereof, the tool carrying members being supported at their inner ends for vertical movement, and being held in fixed angular relation to the longitudinal axis of the tractor regardless of the steering position of the steering means, and their outer ends being supported on ground engaging supports.

Another object is to provide improved ground engaging means for supporting the tool carrying members.

In the particular embodiment chosen for the purpose of illustrating the invention the implement tools consist of sickle bar means for mowing a hay crop and raking means for raking the hay into windrows, but within the broader objects of the invention, generally enumerated above, various other implement tools may be substituted for these hay tools. With reference to these hay tools, however, further objects of the invention are to provide an improve construction of implement attachment for supporting, operating and adjusting the sickle bar means, and for supporting and operating the raking means so as to rake the hay into windrows.

Other objects and advantages of the invention will appear from the following description of a preferred embodiment thereof. In the accompanying drawings, illustrating such embodiment:

Figure 1 is a side elevation of the improved machine;

Figure 2 is a plan view thereof;

Figure 3 is an enlarged detail, being substantially a longitudinal vertical section on line 3—3 of Figure 2;

Figure 4 is a detail, being a partial longitudinal section on line 4—4 of Figure 6;

Figure 5 is a vertical cross-section on line 5—5 of Figure 2;

Figure 6 is a partial longitudinal section on line 6—6 of Figure 3;

Figure 7 is an enlarged rear view showing the inner end portions of the finger bars and their connections;

Figure 8 is a perspective view illustrating the mechanism for reciprocating the sickle bars and also the manner in which the finger bars are mounted;

Figure 9 is a vertical section on line 9—9 of Figure 10, illustrating the construction of one of the rakers;

Figure 10 is an elevation of one of the rakers, partly broken away, and some parts being in section;

Figure 11 is a detail, illustrating the eccentric by which the sickle bars are reciprocated;

Figure 12 is a detail, being a view taken on line 12—12 of Figures 2 and 14, illustrating the devices employed for swinging either or both finger bars vertically;

Figure 13 is principally a side elevation of the parts shown in Figure 12, some parts being, however, shown in section;

Figure 14 is a plan view of the parts shown in Figure 13;

Figure 15 is substantially a horizontal vertical section on line 15—15 of Figure 2, showing the mechanism through which the rakers are driven from the motor which drives the tractor; and Figure 16 is a vertical cross-section on line 16—16 of Figure 15, showing one of the clutch members illustrated in Figure 15 and the yoke by which such clutch member is shifted.

The improved machine, in the embodiment thereof illustrated, comprises a rear or tractor frame 17 and a forwardly extending front or implement frame 18 in laterally rigid relation to the tractor frame but pivotally connected therewith to swing up and down by pivots 19, 20 adjacent to the opposite sides of the machine, as shown in Figs. 1 and 2. The front frame 18 may be supported at any height relative to the rear or tractor frame 17, but preferably, as in the arrangement shown, it is disposed lower than the rear frame. The latter frame is provided with a front cross-bar 21 from which depend hangers 22, shown in Fig. 1, and the pivots 19, 20 are connected with these hangers. The tractor frame is mounted upon rear traction wheels 23, and it is supported at the front on swiveled steering means, preferably in the form of two steering wheels 24 of the automobile type arranged to be steered by an operator on the tractor. By this construction the position of the front frame 18 with respect to the tractor frame is not affected by steering movements of the steering wheels, and this is true also of the transversely extending tool carrying members hereinafter referred to that are carried by the front frame.

The traction wheels are provided with gears 25 which mesh with pinions 26 carried by a transverse shaft 27 driven by a motor mounted on the rear frame 17. In the construction illustrated, the motor employed is a steam engine, preferably of the type shown and described in prior Patent No. 1,533,359, issued April 14, 1925, for improvements in harvesting machines, but if preferred an internal combustion motor such as that shown and described in Patent No. 1,446,605, for "agricultural implement" issued February 27, 1923, may be employed. In the machine shown in these patents the motor not only drives a transverse shaft, such as the shaft 27, illustrated in Figure 1, but also drives a second transverse shaft through which power is transmitted to certain operating parts, and operates automatic steering connections by means of which the steering wheels are turned in one direction or the other by power, and the course followed by the machine is automatically controlled. The same features are incorporated in the present machine, but it is believed to be unnecessary to describe them in detail as they are not claimed herein per se, but only insofar as they are generically comprised within the subject matter of the present invention. It will, therefore, suffice to point out such parts briefly. 28 indicates the steam engine considered as a whole, and 29 indicates a boiler which supplies steam to the engine. The engine 28 is located at one side of the frame 17 intermediately of the length thereof, and the boiler 29 is preferably located at the rear end portion of said frame between the traction wheels 23.

30 indicates the driver's seat, which is located in advance of the boiler 29 and at one side of the engine 28, as shown in Figure 2. 31 indicates a water tank, or reservoir, which is preferably located at the forward end portion of the frame 17 and is suitably connected with the boiler 29. 32 indicates a transverse shaft from which power is transmitted to the operating parts of the implement or implements carried by the front frame, said shaft being driven by the steam engine 28 in any suitable way, as by the connection shown in prior Patent No. 1,533,359. For example, 33 indicates an arm or lever arranged to be turned backward or forward by any suitable mechanism operated by the engine, the operation of which arm effects the steering of the front wheels by power, as described in such prior patent. 34 indicates a hand steering wheel mounted on a steering post 35 for steering the front wheels by hand, also as described in said prior patent. As the present invention contemplates the use of any approved construction for steering the front wheels by power and by hand, and is not concerned with the specific mechanism that may be provided for that purpose, it is not deemed necessary to describe it herein. 36 indicates mud guards or fenders for the traction wheels, and 37 indicates lamps mounted on said mud guards. 38 indicates a generator, which is arranged to be operated in any suitable way from the motor 28 for supplying electric current to the lamps 37, as shown in Figure 2.

39 indicates a canopy or top supported by posts 40 above the driver's seat, as shown in Figure 1.

The forward portion of the front frame is adjustably supported by means of a caster wheel 41 mounted in a yoke 42 which is provided with a vertical spindle 43, as shown in Figure 3. At the lower end of the spindle 43 is a head 44, upon which bears the lower end of a sleeve 45 fitted upon the spindle 43, and serving as a bearing therefor. This sleeve is mounted to slide longitudinally in a vertical bearing 46 secured to the forward portion of the front frame 18, as shown in Figure 3, and is prevented from rotating therein by a feather or key 47. As shown in Figure 2, the front frame comprises bars 48—49 which converge toward the front until they almost meet, and then extend forward in parallelism with each other, and the bearing 46 is secured between them. The parallel portions of the bars 48—49 are indicated by 48ª—49ª, respectively. The rear end portions of the bars 48—49 are bent inwardly at right angles, as shown at 48ᵇ—49ᵇ in Figure 2, and are connected to the front bar 50 of a rectangular frame which extends transversely of the machine, as shown in Figure 2. The rear bar of the latter frame carries the hinges or pivots 19—20 by which the front frame as a whole is connected with the tractor frame. Preferably the bars 50—51 are integrally united at one end, as shown at 52 in Figure 2, and at their other ends they are connected by a brace 53.

They are also connected intermediately by braces 54—55, as shown in said figure. 56—57 indicate longitudinally extending braces which connect the bar 50 with the bars 48—49, respectively.

58 indicates a collar or flange at the lower end of the sleeve 45, upon which the lower end of the bearing 46 rests, as shown in Figure 3. From the foregoing description, it will be apparent that the forward portion of the front frame is sustained by the caster wheel 41 through the collar 58 and the head 44. In order to adjust the forward portion of the front frame upon the sleeve 45, a link 59 is provided which is pivoted at its lower end upon a pivot 60 mounted in lugs 61 carried by the collar 58. The upper end of said lever is pivotally connected to an arm 62 carried by a rock-shaft 63, which also carries a crank 64. The rock-shaft 63 is disposed transversely of the machine and is journaled in suitable bearings provided in lugs 65, carried by the bearing 46. It will be evident from the foregoing description that by pulling back the crank 64 from the position shown in Figure 3, the resulting downward thrust upon the link 59 will move the bearing 46 upward upon the sleeve 45, carrying with it the forward portion of the front frame. For operating the crank 64 to vertically adjust the front frame in the manner described, there is provided an operating bar 66, shown in Figures 1 and 3, the rear end of which is provided with notches at its under side, similar to those shown at 67 in Figures 1 and 13.

The notched portion of the bar 66 extends through a guide loop 68, shown in Figure 12, and is adapted to engage a lug or tooth 69 which lies within said loop, in the manner shown in Figure 13 in connection with a similar bar 112 hereinafter described, thereby locking the bar 66 against endwise movement. The loop 68 is large enough to permit the bar 66 to be lifted out of engagement with the tooth 69 to permit it to be moved endwise, but normally the bar 66 is held in its locked position by a spring 70 which bears down upon it, in the manner shown in Figure 13 in connection with the bar 112. For actuating the bar 66 to unlock it and also to move it endwise, there is provided a handle 71 which is connected to the bar 66 intermediately thereof and extends back to a point within convenient reach of the operator's seat, as shown in Figures 1 and 2. Thus the operator may easily adjust the height of the forward portion of the front frame without leaving his seat. When the frame is so adjusted, the rear portion thereof rocks upon the pivots 19—20. The loop 68, as well as some other parts which will be hereinafter described, is carried by a bracket 72 which is secured to the cross bar 50, as shown in Figures 2, 12 and 13, so that the bars 66 and 71 have no connection with the tractor frame. The object of this arrangement is to facilitate the disconnection of the front frame and the parts associated with it from the tractor frame when it is desired to use the tractor for some other purpose.

Extending transversely with respect to the longitudinal axis of the tractor are two tool carrying members, preferably in the form of bars alined with each other and suitably connected with the forward portion of the front frame 18 so that their outer ends are capable of swinging up and down. At their outer ends these bars are provided with ground engaging supporting devices of any suitable form. These transversely extending members serve as means for supporting and transmitting draft force to the implement tools, which in the illustrated embodiment of my invention comprise mowing devices, but it is to be understood that my invention may be embodied in other implements wherein such transverse members would be arranged to support other types of implement tools. In the illustrated construction the ground supporting devices for the outer end portions of the transverse bars 73, 74 are in the form of shoes 75, 76, from the rear portions of which extend inwardly inclined deflectors 77, 78, as shown in Fig. 2. The inner ends of said bars adjoin, as shown in Figs. 6 and 8, and are provided respectively with shoes 79, 80, which are pivoted to rock upon longitudinally extending front and rear pivots 81, 82 in alinement with each other, as shown in Fig. 8, so that the outer ends of said bars may be swung vertically about said pivots. The pivots 81, 82 are carried by a yoke or bracket 83 which is pivotally mounted intermediately upon a transversely disposed pivot 84, carried by a bracket 85 secured to the lower end of a standard 86 which depends from the forward portion of the front frame 18, as shown in Fig. 3.

This standard, which is preferably a substantial metal plate, extends between the members 48ª—49ª, and is secured thereto by rivets 87, as shown in Figure 3. Thus the standard 86 is held rigidly in position at substantially the transverse center of the machine. Provision may be made for swinging the bars 73—74 vertically about the pivots 81—82, and to this end there are provided bell-crank levers 88—89 mounted on a pivot 90 carried by the bearing 46, as shown in Figure 3. Said bell-crank levers are connected respectively by links 91—92 with the shoes 79—80, as shown in Figures 7 and 8, so that by rocking said levers in the appropriate direction, the finger bars 73—74 may be swung upward. The levers 88—89 are connected by rods 93—94, respectively, to swinging arms 95—96 mounted on a pivot 97 carried by the bracket 72, as shown in Figures 12 and 13. The arms 95—96 are vertically arranged, and at their upper ends are provided with heads 98—99 having notches 100—101, respectively. The heads 98—99 lie adjacent to each other, as shown in Figure 14, and their adjacent margins are provided with lips 102—103 which approach each other closely, substantially forming a third notch between the two heads, as shown in the latter figure. It will be apparent that backward movement of either arm 95—96 alone will swing the finger bar connected with such arm upward, and that by moving both said arms back in unison, both finger bars will be simultaneously raised out of operative position.

For the purpose of manipulating the arms 95—96 to adjust the position of the bars 73—74, an operating lever 104 is provided which is mounted to swing laterally upon a pivot 105 carried by an arm 106 mounted on the pivot 97 between the arms 95—96, as shown in Figure 12. The lever 104 extends forward of the arms 95—96, and thence back to a point within convenient reach of the operator's seat, as shown in Figures 1 and 2. If the operator wishes to lift the left hand bar 73, as viewed in Figure 2, he swings the lever 104 laterally into engagement with the notch 100 of arm 95, which arm is connected with the left hand bar 73. By then depressing the rear end of the lever 104, the arm 95 will be swung backward and the bar 73 raised. In like manner he may move the lever 104 into notch 101 and raise the other bar 74. By moving the lever 104 into the space between these two notches 100—101, it will engage both lips 102—103, and consequently will operate both arms 95—96, simultaneously thereby raising both bars 73—74. Preferably balancing springs 107 are provided for substantially floating said bars, these springs being connected at their upper ends to the forward portion of the front frame, and at their lower ends to collars 108 secured upon the rods 91—92, as shown in Figure 3.

The yoke 83 is rocked about its pivot 84 to simultaneously vary the pitch of the bars 73—74 and sickles carried thereby by means of a bell-crank lever 109 which is mounted upon a pivot 110 at the forward portion of the front frame, as shown in Figure 3.

One arm of said lever is connected with the forward portion of the yoke 83 by a connecting rod 111, and an operating bar 112 is connected to the other arm of said lever and extends back through a loop 113 carried by the bracket 72, as shown in Figures 12 and 14. The operating bar 112 is similar in construction to the bar 66, being provided with the teeth 67 on its under side adapted to engage a lug 69 at the under side of said loop, as shown in Figure 13, and as described in connection with the bar 66. A hand lever 114 is connected with the intermediate portion of the bar 112, as shown in Figure 14, and extends back far enough so that it may be operated from the driver's seat. It will be evident that by moving the lever 114 longitudinally after the bar 112 has been unlocked, the forward portion of the yoke 83 will be raised or lowered, thereby changing its angular position and varying the pitch of the sickle bars mounted on the transversely extending draft bars 73—74.

115—116 indicate the sickle bars which are mounted upon the said bars 73—74, respectively, and reciprocate thereon. The manner in which the sickle bars are mounted is best shown in Figures 5 and 6, from an inspection of which it will be seen that a slide bar 117 is secured to the under side of the sickle bar adjacent to its rear margin, and plates 118 are secured to the upper side of the sickle bar and extend over the adjacent portion of the finger bar upon the upper surface of which they bear.

The rear margins of these plates 118 are beveled, as best shown in Figure 5, the upper portions of these plates being overlapped by retaining blocks 119 secured to the finger bar by bolts 120. The slide bars 117 fit in grooves in the fingers 121 of the finger bar placed adjacent to the forward margin of the finger bar, as shown in Figure 5. Thus, the sickle bars are held properly in operative position. As shown in Figure 6, the cutting edges of the sickles are beveled on their under sides instead of on their upper sides, as has heretofore been the usual practice, and they operate in connection with ledger plates 122 secured to the under sides of the overlying portions 121ª of the fingers 121. By arranging and mounting the sickle bars in the manner described, the blocks 119 operate to hold the cutting edges of the sickles in proper operating relation to the ledger plates, and insure efficient operation of the sickles.

The sickle bars are reciprocated in unison by a vertically-disposed rock-shaft 123, as shown in Figures 3 and 8. As shown in Figure 3, the upper portion of said shaft is mounted in a suitable bearing 124 provided at the forward end portion of the front frame, and its lower end is mounted in a bearing 125 carried by the bracket 85. At its lower end the rock-shaft 123 carries a crank 126, which extends rearwardly and carries at its rear end a rectangular yoke 127, as shown in Figures 4 and 8. This yoke embraces a bearing block 128 which is mounted upon the stem 129 of a a yoke 130, which carries a pivot 131, as best shown in said figures.

The sickle bars 115—116 are connected to the pivot 131 by plates 132—133 which are secured to said sickle bars adjacent to their inner ends, and are provided with sleeves 134—135 which fit upon said pivot. Thus the sickle bars are connected with the crank 126 by a connection in the nature of a universal coupling which is sufficiently flexible to accommodate itself to the different angular adjustments of the finger and sickle bars.

For rocking the rock-shaft 123 to actuate the sickle bars, it is provided at its upper end with a crank 136, as shown in Figures 2 and 3, said crank being connected by a connecting rod 137 with an eccentric strap 138, shown in Figure 11. The connection between the rod 137 and the eccentric strap 138 is adjustable, as shown in the latter figure, so that the stroke of the sickle bars may be varied. This is best accomplished by threading the rear end of the rod 137 and screwing it into a sleeve 139, which forms a part of the eccentric strap. A lock nut 140 secures the parts in fixed relation to each other. The eccentric strap 138 operates upon an eccentric 141 carried by a transverse shaft 142 mounted upon the rear portion of the front frame, as shown in Figure 2. As there shown, the shaft 142 is mounted in suitable bearings in the members 52—54, and 55. The shaft 142 is driven from the shaft 32 mounted on the tractor frame, the devices employed for that purpose being as follows:

143 indicates a bevel pinion mounted on one end portion of the shaft 32, as shown in Figures 2 and 15. Said bevel pinion meshes with bevel gear 144 loosely mounted upon a longitudinally-extending shaft 145 carried at one side of the rear frame 17. Both these gears are enclosed in a housing 146, as shown in Figure 15. 147 indicates a clutch member connected with the hub of the bevel gear 144, and 148 indicates a coacting clutch member mounted on a feather on the shaft 145 so that it rotates therewith and is movable longitudinally thereof. The clutch member 148 is moved into and out of engagement with the clutch member 147 by a yoke lever 149 mounted on a pivot 150 carried by bracket 151 which also forms a bearing for the shaft 145, as shown in Figure 15. The lever 149 is connected by a link 152 with an operating lever 153 arranged near the driver's seat, as shown in Figure 2, so that he may readily move the clutch member 148 into or out of engagement with the clutch member 147. At its forward end, the shaft 145 carries one member 154 of a universal coupling, the other member 155 of which is pivotally connected to a sleeve 156 having a non-circular bore which receives the correspondingly shaped rear end of a connecting shaft 157, these parts forming a telescopic connection. The forward end of the latter shaft is connected by a universal coupling 158 with a shaft 159 mounted on the cross bar 51, as shown in Figure 2. The latter shaft carries a bevel gear 160 which meshes with a bevel gear 161 carried by the shaft 142.

By this construction, the shaft 32 drives the shaft 142, but such parts may readily be disconnected from each other to permit the front frame and the parts carried by it to be disconnected from the tractor frame. The telescopic connection and universal joints associated therewith permit the front frame to be vertically adjusted without interfering with the operation of the driving mechanism. At any time when it is desired to drive the shaft 32 without driving the shaft 142 and the parts connected therewith, this may be accomplished by disconnecting the clutch members 147—148.

When the implement tools carried by the two transverse bars 73—74 consist of sickle means for cutting hay crops, etc., as shown in the exemplary embodiment illustrated, the implement attachment may also include raking means for raking the cut hay into windrows, as will now be described. 162—163 indicate two raker frames oppositely inclined to the longitudinal axis of the machine, and converging rearwardly. Their rear ends are spaced apart a distance approximately equal to the space between the traction wheels, as shown in Figure 2. These rakers are on a somewhat lower level than the front frame 18, as shown in Figure 1, and they are secured to the front frame by depending bars 164 arranged at convenient points, as shown in Figure 2. The two raker frames and the parts carried by them are alike, and therefore the same reference numerals serve to indicate corresponding parts of both. Each of the rakers comprises a longitudinal shaft 165 journaled in suitable bearings in the opposite end portions of the raker frame, as shown in Figure 10, said shaft being provided at one end with a worm gear 166 which meshes with a worm 167 carried by the shaft 142.

The arrangement of these worms on the latter shaft is shown in Figure 2. As there shown, the two sets of worms and worm gears are arranged to rotate the shafts 165 in opposite directions as viewed from the inner ends thereof, the shaft carried by the raker frame 162 rotating in a counterclockwise direction, and that carried by the raker frame 163 rotating in a clockwise direction. 168—169 indicate triangular heads mounted upon the opposite end portions of the shaft 165 and rotating therewith, as shown in Figures 9 and 10. 170 indicates three shafts loosely mounted in the arms of the heads 168—169, each of which shafts is provided with a series of spring teeth 171. The shafts 170 are also provided with crank arms 172 which carry rollers 173 adapted to travel in cam grooves 174 provided in stationary heads 175 secured to the opposite end portions of the raker frame. It will be obvious that as the shaft 165 rotates, the shafts 170 will revolve about it as an axis, and the rollers 173 traveling in the grooves 174 will consequently rock the shafts 170, thereby moving the teeth 171 through paths determined by the shape of the cam grooves. These grooves are so shaped as to bring the teeth to a substantially vertical position as they approach and move over the ground so that the hay cut by the mower is raked toward the center of the machine and is also loosened.

As shown in Figure 2, the forward portions of the raker frames substantially aline with the guides 77—78, which direct the hay cut by the outer end portions of the mower toward the outer end portions of the rakers so that all the hay cut is acted upon by the rakers, and as successive teeth come into action it is gradually worked toward the longitudinal axis of the machine until the innermost teeth leave it in windrows which lie within the track of the traction wheels. As the rakers leave the hay in windrows between the wheels, it is not crushed or trampled down, and consequently can cure under more favorable conditions. In order to insure the stripping of the hay from the rake teeth, stripper bars 176 are provided between successive teeth, as shown in Figures 9-10, said strippers being secured to the side bars of the raker frames, as shown in Figure 9.

From the foregoing description, it will be manifest that the hay is not crushed or trampled down in advance of the mower, and that, although a very wide swath is cut, all the hay cut by both sickle bars is raked into a single loose windrow, which is left undisturbed by the passage over it of the machine so that it cures under favorable conditions and may subsequently be more easily taken up for the purpose of stacking it.

The operator on the tractor frame always has a clear view of his course, and may guide the machine either by hand or by the use of the power operated steering mechanism, or both, as he may prefer. The adjustments provided for as hereinbefore described may be made by the driver from his seat, and he also has control of the driving connections so that the mowing and raking devices may be thrown into and out of operation at his pleasure. The manner in which the driving connections are made permits the front frame with the parts carried by it to be easily disconnected from the tractor frame without disarranging any of the parts carried by the latter so that it is left in shape to be used for other work.

In summarizing the structural features of the device whereby the objects mentioned in the fore part of the description are attained, it will be noted that the laterally extending bars 73—74, which support and transmit draft to the implement tools 115—116, have their inner ends pivotally connected at 81—82 on approximately horizontal pivot axes, and have their outer ends supported on the ground engaging supporting devices 75—76. Thus, these implement carrying bars can swing vertically, independently of each other, as the implement passes over uneven ground, thereby insuring proper operation and efficiency of the implement tools carried by said bars when operating over sloping or uneven ground.

The implement tools may readily be adjusted vertically relatively to the caster wheel supporting means 41, and may also be moved to an inoperative position, all through adjusting or control means actuatable from the operator's position on the tractor. For example, the implement tools may be adjusted vertically by actuating the adjusting handle 71 which operates through the bar 66 to swing the crank 64, thereby raising or lowering the implement tools relatively to the caster wheel supporting means 41. Such actuation of the control member 71 also effects pivotal movement of the front frame or supporting means 18 relatively to the tractor about the pivot means 19—20. Moreover, by actuating the handle or lever 114, the operator can rock the implement tools about the pivot axis 84, thereby adjusting said tools vertically relatively to the ground. If it is desired to move the implement tools mounted on both laterally extending bars 73—74 to inoperative positions, the operator places the lever 104 in position to engage both lips 102—103 on the swinging arms 95—96, and then exerts downward pressure on said lever 104, with the result that the bell crank levers 88—89 and links 91—92 are actuated to swing the implement tools upwardly to inoperative positions.

It will be apparent that numerous modifications, substitutions, and rearrangements may be made without departing from the essence of the invention.

What we claim as the invention of said CHARLES E. WHITE, deceased, and desire to secure by Letters Patent, is—

1. An agricultural implement comprising a tractor element, raking devices in advance of and connected with said tractor element, said raking devices being arranged at opposite sides of the longitudinal axis of the implement and converging rearwardly, and means for rotating said raking devices in opposite directions.

2. An agricultural implement comprising a tractor element, raking devices in advance of and connected with said tractor element, said raking devices being arranged at opposite sides of the longitudinal axis of the implement and converging rearwardly, and means driven from said tractor element for rotating said raking devices in opposite directions.

3. An agricultural implement comprising a tractor element, raking devices in advance of and connected with said tractor element, said raking devices being arranged at opposite sides of the longitudinal axis of the implement and converging rearwardly, and means driven from said tractor element and detachably connected therewith for rotating said raking devices in opposite directions.

4. An agricultural implement comprising a tractor frame, propelling and steering wheels and a motor carried thereby, a front frame arranged in advance of said tractor frame and detachably connected therewith, rotary raking devices connected with said front frame, and means for rotating said raking devices.

5. An agricultural implement comprising a tractor frame, propelling and steering wheels and a motor carried thereby, a front frame arranged in advance of said tractor frame and detachably connected therewith, rotary raking devices connected with said front frame, and means operated by said motor for rotating said raking devices.

6. An agricultural implement comprising a tractor frame, propelling and steering wheels and a motor carried thereby, a front frame arranged in advance of said tractor frame and detachably connected therewith, diagonally-disposed rotating implement tools connected with said front frame at opposite sides thereof, and means operated by said motor for driving said implement tools.

7. An agricultural implement comprising a tractor frame, propelling and steering wheels and a motor carried thereby, a front frame arranged in advance of said tractor frame and detachably connected therewith, rotary raking devices connected with said front frame, means for rotating said raking devices, and a caster wheel supporting the forward portion of said front frame.

8. An agricultural implement comprising a tractor frame, propelling and steering wheels and a motor carried thereby, a front frame arranged in advance of said tractor frame and detachably connected therewith, diagonally-disposed rotating implement tools connected with said front frame at opposite sides thereof, means operated by said motor for driving said implement tools, and a caster wheel supporting the forward portion of said front frame.

9. An agricultural implement comprising a tractor frame, propelling and steering wheels and a motor carried thereby, a front frame arranged in advance of said tractor frame and detachably connected therewith, rotary raking devices connected with said front frame, means for rotating said raking devices, a caster wheel supporting the forward portion of said front frame, and means for vertically adjusting said front frame on said caster wheel.

10. An agricultural implement comprising a tractor frame, propelling and steering wheels and a motor carried thereby, a front frame arranged in advance of said tractor frame and detachably connected therewith, diagonally-disposed rotating implement tools connected with said front frame at opposite sides thereof, means operated by said motor for driving said implement tools, a caster wheel supporting the forward portion of said front frame, and means for vertically adjusting said front frame on said caster wheel.

11. An agricultural implement comprising a tractor frame, a motor mounted thereon, a front frame detachably connected with said tractor frame, implement tools connected with said front frame, driving mechanism for said implement tools mounted on said front frame and detachable therewith, and separable connections between said motor and said driving mechanism.

12. An attachment for tractors comprising a support adapted to be connected with the front portion of a tractor to extend forwardly therefrom, transversely extending members connected with said support for vertical movement of their outer ends, ground engaging supporting means at the outer end portions of said members, and implement tools carried by said members and located between said ground engaging supporting means and the inner ends of said members.

13. The combination with a tractor, of supporting means mounted on and extending forwardly of the tractor, opposite transversely extending members pivotally supported on said supporting means adjacent to the longitudinal center line of the tractor for vertical swinging movement of the outer end portions thereof and extending beyond each side of the tractor, a ground engaging support on the outer end of each member, and implement tools carried by the members between the inner sides of the said ground engaging supports and the points of pivotal connection of said members, respectively, with said supporting means.

14. The combination with a tractor, of supporting means mounted on and extending forwardly of the tractor, opposite transversely extending members pivotally supported on said supporting means adjacent to the longitudinal center line of the tractor for vertical swinging movement of the outer end portions thereof and extending beyond each side of the tractor, swiveled ground engaging supporting means for said members, and implement tools carried by said members at opposite sides of the tractor.

15. An attachment for tractors comprising a support adapted to be connected with the front portion of a tractor to extend forwardly therefrom in laterally rigid relation thereto, transversely extending members connected with said support for vertical movement of the outer end portions thereof, ground engaging supporting means at the outer end portions of said members, and implement tools carried by said members and located between said ground engaging supporting means and the inner ends of said members.

16. An attachment for tractors comprising a support adapted to be connected with the front portion of a tractor to extend forwardly therefrom in laterally rigid relation thereto, transversely extending members pivotally connected with said support for vertical movement of the outer end portions thereof, ground engaging supporting means at the outer end portions of said members, and implement tools carried by said members and located between said ground engaging supporting means and the inner ends of said members.

17. The combination with a tractor provided with steering means at the forward end portion thereof, of supporting means connected with the front portion of the tractor and extending forwardly therefrom, transversely extending tool carrying members supported at their inner ends by said supporting means, in fixed angular relation to the longitudinal axis of the tractor, for movement of their outer end portions toward or from the ground, and ground engaging supporting means at the outer end portions of said tool carrying members.

18. The combination with a tractor provided with steering means at the forward end portion thereof, of supporting means connected with the front portion of the tractor and extending forwardly therefrom, transversely extending tool carrying members pivotally supported at their inner ends by said supporting means, in fixed angular relation to the longitudinal axis of the tractor, for movement of their outer end portions toward or from the ground, and ground engaging supporting means at the outer end portions of said tool carrying members.

19. The combination with a tractor provided with vertically swiveled steering means at the forward end portion thereof, of supporting means connected with the front portion of the tractor and extending forwardly therefrom, transversely extending tool carrying members supported at their inner ends by said supporting means, in fixed angular relation to the longitudinal axis of the tractor, for movement of their outer end portions toward or from the ground, and ground engaging supporting means at the outer end portions of said tool carrying members.

20. The combination with a tractor, of an implement attachment disposed at the front end of the tractor comprising supporting means mounted on the front portion of the tractor and projecting forwardly therefrom, a pair of transversely extending bars supported adjacent to their inner ends by said supporting means for vertical movement of the outer ends thereof, and having their outer ends projecting laterally beyond the sides of the tractor, ground engaging supporting devices connected to the outer portions of said bars, and implement tools carried by said bars between the inner and outer ends thereof.

21. The combination with a tractor, of an implement attachment disposed at the front end of the tractor comprising supporting means mounted on the front portion of the tractor and projecting forwardly therefrom, a pair of transversely extending bars supported adjacent to their inner ends on said supporting means for vertical movement of the outer ends thereof, and having their outer ends projecting laterally beyond the sides of the tractor, caster wheel supporting means for said bars, and implement tools carried by said bars between the inner and outer ends thereof.

22. The combination with a tractor, of an implement attachment disposed at the front end of the tractor comprising supporting means mounted on the front portion of the tractor and projecting forwardly therefrom, a pair of laterally extending bars pivotally supported adjacent to their inner ends on said supporting means for vertical movement of the outer ends thereof, and having their outer ends projecting laterally beyond the sides of the tractor, ground engaging supporting devices connected to the outer ends of said bars, and implement tools carried by said bars between the inner and outer ends thereof.

23. The combination with a tractor, of an implement attachment disposed at the front end of the tractor comprising supporting means mounted on the front portion of the tractor and projecting forwardly therefrom, a pair of laterally extending bars pivotally connected adjacent to their inner ends on said supporting means for vertical movement of the outer ends thereof, and having their outer ends projecting laterally beyond the sides of the tractor, caster wheel supporting means for said bars, and implement tools carried by said bars between the inner and outer ends thereof.

In witness whereof, I have hereunto subscribed my name this 23rd day of December, 1929.

CHARLES HAROLD WHITE,
*One of the Joint Executors of the Estate of Charles E. White, Deceased.*

In witness whereof, the Peoples Savings Bank & Trust Company of Moline hereunto subscribes its name by its thereunto duly authorized officer, on this 23rd day of December, 1929.

[L. S.] PEOPLES SAVINGS BANK & TRUST COMPANY OF MOLINE,
By J. DE BISSCHOP,
*Trust Officer,*
*One of the Joint Executors of the Estate of Charles E. White, Deceased.*